US010821592B2

(12) United States Patent
André

(10) Patent No.: US 10,821,592 B2
(45) Date of Patent: Nov. 3, 2020

(54) POWER WRENCH WITH ANGLE DRIVE

(71) Applicant: ATLAS COPCO INDUSTRIAL TECHNIQUE AB, Stockholm (SE)

(72) Inventor: Mattias Ilhan André, Johanneshov (SE)

(73) Assignee: ATLAS COPCO INDUSTRIAL TECHNIQUE AB, Stockholm (SE)

( * ) Notice: Subject to any disclaimer, the term of this patent is extended or adjusted under 35 U.S.C. 154(b) by 209 days.

(21) Appl. No.: 15/774,710

(22) PCT Filed: Dec. 9, 2016

(86) PCT No.: PCT/EP2016/080364
§ 371 (c)(1),
(2) Date: May 9, 2018

(87) PCT Pub. No.: WO2017/097951
PCT Pub. Date: Jun. 15, 2017

(65) Prior Publication Data
US 2018/0354116 A1 Dec. 13, 2018

(30) Foreign Application Priority Data
Dec. 11, 2015 (SE) ..................................... 1551622

(51) Int. Cl.
*B25F 5/00* (2006.01)
*B25B 21/00* (2006.01)
*B25B 23/00* (2006.01)
(52) U.S. Cl.
CPC .............. *B25F 5/001* (2013.01); *B25B 21/00* (2013.01); *B25B 23/0007* (2013.01); *B25B 23/0028* (2013.01)
(58) Field of Classification Search
CPC .......... F16H 55/20; F16H 55/22; F16H 55/24; F16H 2048/282; B25F 5/001;
(Continued)

(56) References Cited

U.S. PATENT DOCUMENTS 2,135,933 A * 11/1938 Blair ........................ A61C 1/07
601/89
3,383,975 A * 5/1968 Cushman .............. F16B 39/023
411/92

(Continued)

FOREIGN PATENT DOCUMENTS

EP 0405132 A1 1/1991
WO 2015097093 A1 7/2015

OTHER PUBLICATIONS

International Search Report (ISR), Written Opinion and International Preliminary Report on Patentability (IPRP) dated Mar. 1, 2017 issued in International Application No. PCT/EP2016/080364.

*Primary Examiner* — David B. Thomas
(74) *Attorney, Agent, or Firm* — Holtz, Holtz & Volek PC

(57) ABSTRACT

An angle type power wrench includes a housing, a motor, an output shaft and an angle drive connecting the motor to the output shaft. The angle drive includes a drive pinion provided with a forward gear head, and a bevel gear provided on the output shaft and engaged by the drive pinion gear head. The drive pinion is surrounded by a bearing support sleeve supporting a forward drive pinion bearing and a rear drive pinion bearing axially spaced from the forward drive pinion bearing. The forward drive pinion bearing includes an inner ball race at a forward end of the drive pinion at or very close to the gear head, and an outer ball race at a forward end of the bearing support sleeve wherein the bearing support sleeve is connected to the housing via an adjustment connection adapted to enabling adjustment of an axial position of the drive pinion.

16 Claims, 2 Drawing Sheets

(58) Field of Classification Search
CPC . B25B 21/00; B25B 23/0007; B25B 23/0028; B25B 13/481; B25B 17/00; F16C 19/166; B23Q 5/045
USPC .............................................. 81/57.13, 57.29
See application file for complete search history.

(56) References Cited

U.S. PATENT DOCUMENTS

| | | | | |
|---|---|---|---|---|
| 3,901,098 | A * | 8/1975 | Jinkins | B23Q 5/045 |
| | | | | 74/417 |
| 4,594,354 | A * | 6/1986 | Berger | A61K 31/70 |
| | | | | 514/460 |
| 5,041,119 | A * | 8/1991 | Frigg | A61B 17/1703 |
| | | | | 606/79 |
| 5,186,068 | A * | 2/1993 | Heller | F16H 1/16 |
| | | | | 384/519 |
| 6,173,792 | B1 * | 1/2001 | Hald | B25B 21/00 |
| | | | | 173/178 |
| 9,926,964 | B2 * | 3/2018 | Philippe | F16B 39/22 |
| 2003/0010158 | A1 | 1/2003 | Listl et al. | |
| 2003/0059142 | A1 * | 3/2003 | Shirokoshi | F16C 19/166 |
| | | | | 384/516 |
| 2011/0317951 | A1 * | 12/2011 | Mauro | F16C 19/18 |
| | | | | 384/500 |
| 2016/0313198 | A1 | 10/2016 | Elsmark et al. | |

* cited by examiner

POWER WRENCH WITH ANGLE DRIVE

TECHNICAL FIELD

The invention relates to an angle type power wrench having an improved angle drive. In particular, the invention concerns an angle type power wrench comprising an improved drive pinion bearing support.

BACKGROUND

A problem encountered when obtaining a correct and reliable torque measurement in power wrenches is variations occurring in the output torque. This is a problem in angle type power wrenches in particular wherein the output torque variations caused by the angle drive and is due to an incorrect gear teeth engagement between the drive pinion and the output shaft bevel gear. In most cases this is the result of an incorrect setting of the axial position of the drive pinion as well as a less rigid drive pinion bearing support. An inaccurate engagement between the drive pinion and the output shaft bevel gear may also result in an undesirably high strain on the gear teeth and an increased mechanical wear of the angle drive.

In order to accomplish a favorable engagement between the drive pinion and the output shaft bevel gear and hence an improved operation of the angle drive it has been found that it is important that the drive pinion has an accurate axial position relative to the output shaft bevel gear and that the drive pinion bearings are arranged in such a way that the forces acting on the drive pinion during torque transfer are counteracted in a favorable way, i.e. not causing any tilting or axial displacement of the drive pinion which in turn would result in an incorrect engagement between the gear teeth of the drive pinion and the bevel gear.

SUMMARY

It is an object of the invention to provide an angle type power wrench with an improved angle drive for mitigating occurring variation of the output torque.

It is a further object of the invention to provide an angle type power wrench having an improved drive pinion bearing arrangement for obtaining an improved accuracy of the angle drive operation and mitigation of occurring output torque variations.

It is a still further object of the invention to provide an angle type power wrench with an angle drive having an improved angle drive pinion bearing support for enabling adjustment and setting of an accurate axial position of the drive pinion.

Other objects and advantages of the invention will appear from the following specification and claims.

The above mentioned objects are, at least partly, obtained by an angle type power wrench as set out in the appended claims.

In accordance with one embodiment an angle type power wrench is provided comprising a housing, a motor, an output shaft, and an angle drive connecting the motor to the output shaft, wherein the angle drive comprises a drive pinion, an output bevel gear connected to the output shaft and a bearing support sleeve supporting the pinion in the housing. The drive pinion is surrounded by a bearing support sleeve supporting a forward drive pinion bearing and a rear drive pinion bearing axially spaced from said forward drive pinion bearing. Hereby an improved support for the drive pinion can be achieved.

In accordance with one embodiment annular guide surfaces are provided on the bearing support sleeve and the housing, respectively to define the radial position of said bearing support sleeve relative to the housing. Hereby the bearing support sleeve can be correctly radially positioned.

In accordance with one embodiment the bearing support sleeve is connected to the housing via an adjustment connection adapted to enabling adjustment of the axial position of the drive pinion. Hereby the pinion can be adjusted in an axial direction.

In accordance with one embodiment a lock adapted to locking the bearing support sleeve in a position corresponding to a desired setting of the drive pinion. Hereby the bearing support sleeve can be locked in a desired position.

In accordance with one embodiment the adjustment connection is a thread connection. Hereby an easy to operate adjustment connection can be achieved.

In accordance with one embodiment the thread connection comprises a threaded rear end portion) of said bearing support sleeve and a threaded portion of the housing, wherein said threaded rear end portion of the bearing support sleeve is elastically expandable to form a friction lock against rotation relative to said threaded portion of the housing. In accordance with one embodiment the threaded rear end portion of the bearing support sleeve is thin walled and provided with longitudinal slots to make said threaded rear end portion of said bearing support sleeve elastically expandable.

In accordance with one embodiment forward drive pinion bearing is an angle contact ball bearing. In accordance with one embodiment the angle contact ball bearing is of a four point contact type having two opposite lateral contact points located on a line forming an acute angle relative to the radial direction.

BRIEF DESCRIPTION OF THE DRAWINGS

The invention will now be described in more detail and with reference to the accompanying drawings, in which.

DETAILED DESCRIPTION ON ONE EMBODIMENT OF THE INVENTION

Figure 1:
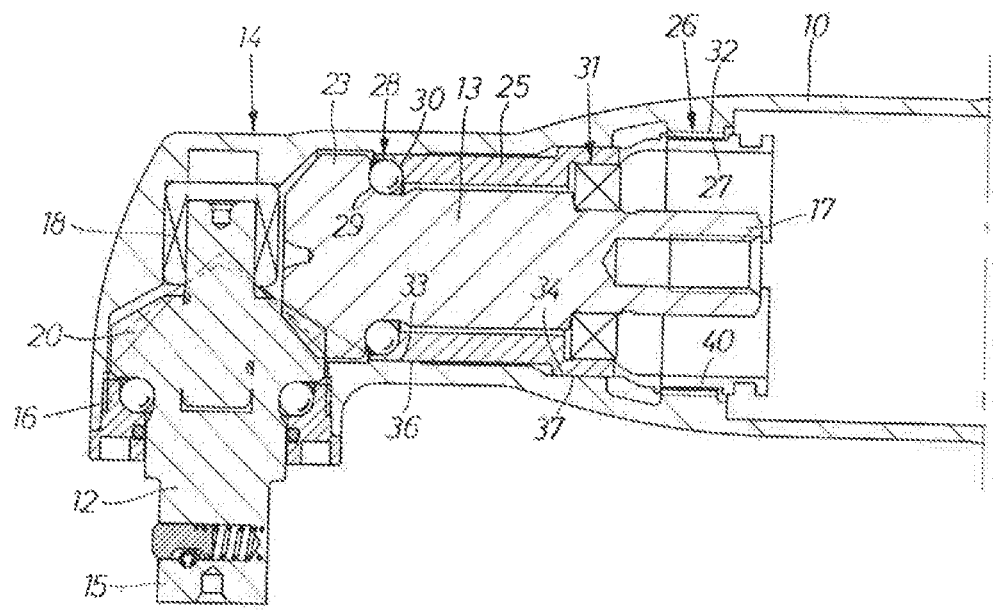
FIG. 1 shows a longitudinal section through the front end of an angle type power wrench.

In FIG. 1 a power wrench is depicted. In FIG. 1 only the forward end of the power wrench is shown. The power wrench comprises a housing 10 including an angle drive 14. The angle drive 14 comprises a drive pinion 13 and an output shaft 12. The output shaft 12 is journalled in a forward ball contact bearing 16 and in a rear needle bearing 18. The output shaft 12 is further is provided with a square output end 15 for carrying a nut socket and a bevel gear 20 in the other end. At its rear end the drive pinion 13 is provided with socket portion 17 for connection to a non-illustrated motor via a reduction gearing. The power transmission described above in conjunction with FIG. 1 is a common type of power transmission in prior art power wrenches and is therefore not described in further detail.

Further, in FIG. 1, the drive pinion 13 is at its forward end formed with a gear head 23 arranged to engage the bevel gear 20 on the output shaft 12 to thereby transfer rotational movement from the drive pinion 13 to the output shaft 12.

In accordance with one embodiment the drive pinion 13 is supported in the housing 10 via a bearing support sleeve 25.

Figure 3:
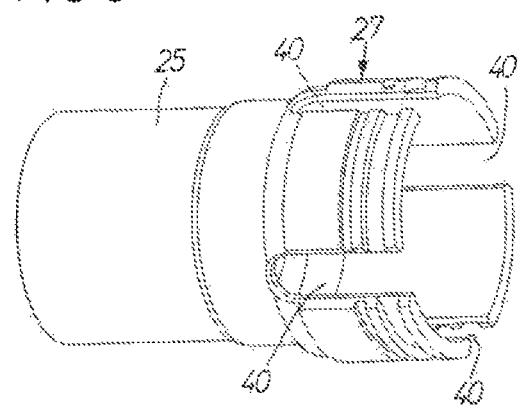
FIG. 3 shows a perspective view of the bearing support sleeve.

In accordance with one embodiment, the bearing support sleeve 25 can be adjustably mounted in the housing 10. The adjustment means for adjusting the bearing support sleeve 25 can in accordance with one embodiment be provided by a thread connection 26 or a similar connection. In the exemplary embodiment depicted in FIG. 1, the bearing support sleeve 25 comprises an externally threaded rear end portion 27 intended to cooperate with a threaded portion 32 in the housing 10. In FIG. 3, the thread of the end portion 27 is not shown in detail.

In accordance with one embodiment, the bearing support sleeve 25 at its forward end is adapted to support the drive pinion 13. The support can be provided by an angle contact ball bearing 28. The angle contact ball bearing can be formed by an inner ball race 29 at the forward end of the drive pinion 13, at or very close to the gear head 23, and an outer ball race 30 at the forward end of the bearing support sleeve 25. Further, the bearing support sleeve 25 can be adapted to support a rear bearing 31 for radial support of the rear end of the drive pinion 13 at a position axially spaced from the forward bearing 28.

The bearing support sleeve 25 can in accordance with some embodiments at its outside be provided with axially spaced annular contact surfaces 33, 34 for close fit with corresponding contact surfaces 36, 37 in the housing 10, thereby providing for an accurately defined radial position of the bearing support sleeve 25 relative to the housing 10. In the embodiment shown in FIG. 1 there are two contact surfaces 33, 34 in the support sleeve that fit with two contact surfaces 36, 37 in the housing. The number of surfaces can be other than two. A lock mechanism is provided for locking the bearing support sleeve 25 against rotation relative to the housing 10 to thereby enable setting of the drive pinion 13 in a desired axial position. This lock mechanism can in accordance with the embodiment depicted in FIG. 1 be formed by the thread connection 26 itself in that the threaded rear end portion 27 of the bearing support sleeve 25 is thin walled and provided with longitudinal slots 40 to make the rear end portion 27 of the bearing support sleeve 25 is elastically deformable in the radial direction. Locking of the bearing support sleeve 25 is obtained by the friction force generated in the thread connection 26 due to radial expansion forces obtained by the elastic deformation features of the bearing support sleeve rear end portion 27 as the rear end portion 27 is threaded into the threaded portion 32 of the housing 10. To enhance the frictional engagement between the housing 10 and the bearing support sleeve 25 the threaded end portion 27 of the latter can be slightly conical in shape, which means that the frictional force is successively increased as the bearing support sleeve 25 is threaded further into threaded portion 32 of the housing 10. This means that the support sleeve 25 and the drive pinion 13 can be locked and accurately set in a desired position. This type of lock mechanism is advantageous in that it provides for a simple adjustment and an accurate step-less setting of the axial position of the drive pinion 13, other locks can however be provided.

Figure 2:
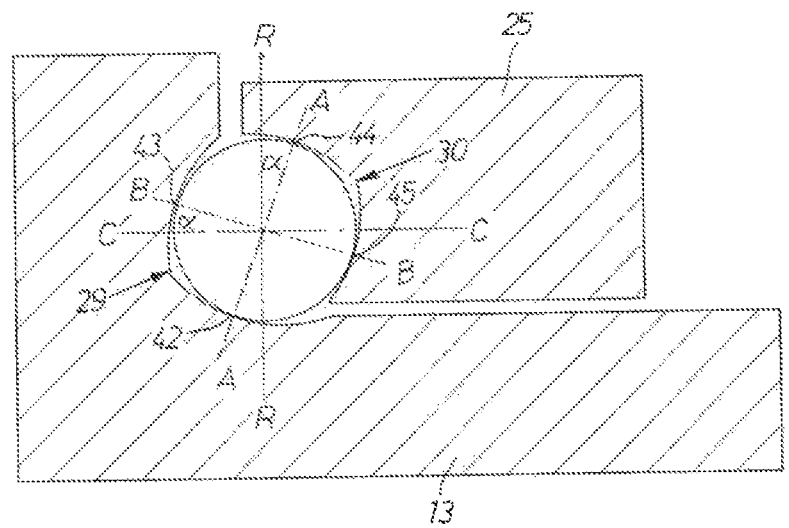
FIG. 2 shows schematically the drive pinion angle contact ball bearing.

In FIG. 2 an exemplary design of an angle contact ball bearing 28 is depicted. In FIG. 2 the angle contact ball bearing 28 is of a four point contact type and has two contact points 42, 43 on the inner ball race 29 and two opposite contact points 44, 45 on the outer ball race 30. See FIG. 2. The two opposite laterally oriented contact points 42 and 44 on the inner and outer ball races, respectively, are located on a line A-A that deviates from a radial line R-R by an acute angle α, for instance by 5-10 degrees. A straight line B-B extending through the two longitudinally oriented contact points 43 and 45 is perpendicular to the line A-A and deviates from a center line C-C of the drive spindle 22 by the same angle α. An axial distance between the forward angle contact ball bearing 28 and the rear radial bearing 31 can act to counteract deviation tendencies of the drive pinion 13 from a true axial direction.

The deviation angle α is employed to accomplish an improved counteraction of the forces exerted on the gear head 23 and the drive pinion 13 during torque transfer through the angle drive, thereby mitigating the strain on the bearings of the drive pinion 13 and the output shaft 12.

In order to accomplish an optimum engagement between the teeth of the drive pinion gear head 23 and the teeth of the output shaft bevel gear 20 the bearing support sleeve 25 can be adjusted and set to obtain an accurate axial position of the drive pinion 13. In case a threaded connection is used, this can be accomplished by rotating the bearing support sleeve 25, whereby the thread connection 26 makes the drive pinion 13 move axially via its contact with the bearing support sleeve 25 via the angle contact ball bearing 28. The most favorable axial position of the drive pinion 13 is the one wherein the engagement between the gear teeth of the drive pinion gear head 23 and the bevel gear 20 on the output shaft 12 is optimum in view of mechanical strain and wear. A correct axial setting of the drive pinion 13 is easily obtained by adjustment of the bearing support sleeve 25 and provides for an output torque with low variation and a long service life of the angle drive.

The one-piece adjustable bearing support sleeve 25 with axially spaced contact surfaces 33, 34 for an accurate support in the housing 10 and axially spaced drive pinion support bearings 28, 31 constitutes a simple and rugged design which enables a low tolerance spreading and a high degree of accuracy during operation and at assembly of the angle drive.

It is to be understood that the embodiments of the invention are not limited to the above described example but may be freely varied within the scope of the claims. Thus, the different elements of the power wrench as described herein can be omitted, supplemented or substituted. For instance, the means provided for locking the bearing support sleeve 25 in a rotation angle position corresponding to a desired setting of the drive pinion 13 could be of different designs. Instead of using a locking mechanism based on friction forces, as described above, other types of locking means may be used.

The invention claimed is:

1. An angle type power wrench comprising:
   a housing;
   a motor;
   an output shaft; and
   an angle drive connecting the motor to the output shaft,
   wherein:
     the angle drive comprises a drive pinion provided with a forward gear head, and a bevel gear provided on the output shaft and engaged by the forward gear head of the drive pinion,
     the drive pinion is surrounded by a bearing support sleeve supporting a forward drive pinion bearing and a rear drive pinion bearing axially spaced from the forward drive pinion bearing,
     the forward drive pinion bearing comprises an inner ball race at a forward end of the drive pinion, and an outer ball race at a forward end of the bearing support sleeve, and the bearing support sleeve is connected to the housing via an adjustment connection consisting of a thread connection which enables adjustment of an axial position of the drive pinion.

2. The angle type power wrench according to claim 1, wherein annular guide surfaces are provided on the bearing support sleeve and the housing to define a radial position of the bearing support sleeve relative to the housing.

3. The angle type power wrench according to claim 2, wherein the forward drive pinion bearing is an angle contact ball bearing.

4. The angle type power wrench according to claim 1, further comprising a lock configured to lock the bearing support sleeve in a position corresponding to a desired setting of the drive pinion.

5. The angle type power wrench according to claim 4, wherein the thread connection comprises a threaded rear end portion of the bearing support sleeve and a threaded portion of the housing, wherein the threaded rear end portion of the bearing support sleeve is elastically expandable to form a friction lock against rotation relative to the threaded portion of the housing.

6. The angle type power wrench according to claim 5, wherein the threaded rear end portion of the bearing support sleeve is provided with longitudinal slots to make the threaded rear end portion of the bearing support sleeve elastically expandable.

7. The angle type power wrench according to claim 6, wherein the forward drive pinion bearing is an angle contact ball bearing.

8. The angle type power wrench according to claim 5, wherein the forward drive pinion bearing is an angle contact ball bearing.

9. The angle type power wrench according to claim 4, wherein the forward drive pinion bearing is an angle contact ball bearing.

10. The angle type power wrench according to claim 1, wherein the thread connection comprises a threaded rear end portion of the bearing support sleeve and a threaded portion of the housing, wherein the threaded rear end portion of the bearing support sleeve is elastically expandable to form a friction lock against rotation relative to the threaded portion of the housing.

11. The angle type power wrench according to claim 10, wherein the threaded rear end portion of the bearing support sleeve is provided with longitudinal slots to make the threaded rear end portion of the bearing support sleeve elastically expandable.

12. The angle type power wrench according to claim 11, wherein the forward drive pinion bearing is an angle contact ball bearing.

13. The angle type power wrench according to claim 10, wherein the forward drive pinion bearing is an angle contact ball bearing.

14. The angle type power wrench according to claim 1, wherein the forward drive pinion bearing is an angle contact ball bearing.

15. The angle type power wrench according to claim 14, wherein the angle contact ball bearing is of a four point contact type having two opposite lateral contact points located on a line forming an acute angle relative to a radial direction.

16. The angle type power wrench according to claim 1, wherein the bearing support sleeve is positioned between the drive pinion and the housing, along a radial direction of the drive pinion.

* * * * *